US006031100A

United States Patent [19]

Badejo

[11] Patent Number: 6,031,100

[45] Date of Patent: Feb. 29, 2000

[54] MICROWAVE SYNTHESES OF QUINACRIDONES, 6,13-DIHYDROQUINACRIDONES, AND 6,13-QUINACRIDONEQUINONES

[75] Inventor: Ibraheem T. Badejo, N. Charleston, S.C.

[73] Assignee: Bayer Corporation, Pittsburgh, Pa.

[21] Appl. No.: 09/063,128

[22] Filed: Apr. 20, 1998

Related U.S. Application Data

[63] Continuation-in-part of application No. 08/933,459, Sep. 18, 1997, abandoned.

[51] Int. Cl.[7] .......................... C09B 48/06; C09B 67/52; C07D 471/00

[52] U.S. Cl. ............................. 546/49; 546/57; 106/495; 106/497

[58] Field of Search ........................ 546/49, 57; 106/495, 106/497

[56] References Cited

U.S. PATENT DOCUMENTS

| | | | |
|---|---|---|---|
| 3,124,582 | 3/1964 | Jaffe | 546/57 |
| 3,157,659 | 11/1964 | Deuschel et al. | 546/56 |
| 3,256,285 | 6/1966 | Fuchs et al. | 564/28 |
| 3,257,405 | 6/1966 | Gerson et al. | 546/49 |
| 3,317,539 | 5/1967 | Jaffe | 546/57 |
| 4,758,664 | 7/1988 | Spietschka et al. | 546/49 |
| 4,812,568 | 3/1989 | Herzog et al. | 546/49 |
| 4,956,464 | 9/1990 | Bender | 546/57 |
| 5,387,397 | 2/1995 | Strauss et al. | 422/129 |
| 5,491,235 | 2/1996 | Campos | 106/495 |
| 5,496,405 | 3/1996 | Campos | 106/495 |
| 5,683,502 | 11/1997 | Badejo | 106/495 |

FOREIGN PATENT DOCUMENTS

| | | |
|---|---|---|
| 682090 | 11/1995 | European Pat. Off. . |
| 2045555 | 10/1995 | Russian Federation . |

OTHER PUBLICATIONS

C. Strauss, Chemistry in Australia, p. 186, Jun. 1990.

S.S. Labana and L.L. Labana, "Quinarcidones" in Chemical Review, 67, 1–18, Jan. 25, 1967.

W. Herbst and K. Hunger, Industrial Organic Pigments, N.Y: VCH Publishers, Inc., 1993, pp. 448–449.

H. Zollinger, Color Chemistry VCH Verlagsgessellschaft, 1991, pp. 239–240.

F.F. Ehrich, "Quinarcidone Pigments" in Pigment Handbook, vol. 1, edited by P.A. Lewis, John Wiley & Sons, 1988.

A.K. Bose et al., Res. Chem. Intermed., 20, 1–11 1994.

G. Majetich and R. Hicks, Res. Chem. Intermed., 20, 61–67 1994.

B.K. Banik et al., Biorganic & Medicinal Chemistry Letters, 3, 2363–2368 1993.

B. Rechsteiner et al., Tetrahedron Lett., 34, pp. 5071–5074 1993.

B.K. Banik et al., Tetrahedron Lett., 32, pp. 3603–3606 1992.

*Primary Examiner*—D. Margaret Seaman

*Attorney, Agent, or Firm*—Joseph C. Gil; Richard E.L. Henderson

[57] ABSTRACT

This invention relates to a process for the preparation of quinacridone pigments by (a) exposing a reaction mixture containing (i) 2,5-dianilinoterephthalic acid, 2,5-dianilino-3,6-dihydroterephthalic acid, 2,5-dianilino-3,6-dioxo-1,4-cyclohexadiene-1,4-dicarboxylic acid, and/or derivatives thereof, (ii) about 3 to about 20 parts by weight, per part of component (a)(i), of a dehydrating agent, and (iii) 0 to about 20 parts by weight, per part of component (a)(i), of a pigment additive, to microwave radiation under conditions that raise the bulk temperature of the reaction mixture to no more than about 250° C., with the proviso that if component (a)(i) is a 2,5-dianilino-3,6-dihydroterephthalic acid or derivative thereof, reaction step (a) additionally comprises an oxidation step;

(b) drowning the reaction mixture in about 3 to about 15 parts by weight, per part of component (a)(i), of a liquid in which the quinacridone pigment is substantially insoluble;

(c) isolating the quinacridone pigment; and (d) optionally, conditioning the pigment.

12 Claims, No Drawings

MICROWAVE SYNTHESES OF QUINACRIDONES, 6,13-DIHYDROQUINACRIDONES, AND 6,13-QUINACRIDONEQUINONES

This application is a Continuation-In-Part of application Ser. No. 08/933,459, filed Sep. 18,1997, now abandoned.

BACKGROUND OF THE INVENTION

This invention relates to the preparation of quinacridone, 6,13-dihydroquinacridone, and 6,13-quinacridonequinone pigments (collectively referred to as "quinacridone pigments") by exposure of appropriate ring-open precursors to microwave radiation.

Processes for the preparation of quinacridone pigments are known. E.g., S. S. Labana and L. L. Labana, "Quinacridones" in *Chemical Review,* 67, 1–18 (1967), and U.S. Pat. Nos. 3,157,659, 3,256,285, and 3,317,539, as well as W. Herbst and K. Hunger, *Industrial Organic Pigments* (New York: VCH Publishers, Inc., 1993), pages 448–449, H. Zollinger, *Color Chemistry* (VCH Verlagsgessellschaft, 1991), pages 239–240, and F. F. Ehrich, "Quinacridone Pigments" in *Pigment Handbook*, Vol. I, edited by P. A. Lewis (John Wiley & Sons, 1988), page 604.

A preferred method for preparing quinacridone pigments involves thermally inducing ring closure of 2,5-dianilinoterephthalic acid intermediates, as well as known aniline-substituted derivatives thereof, in the presence of polyphosphoric acid. E.g., U.S. Pat. No. 3,257,405. After ring closure is complete, the melt is drowned by pouring into a liquid in which the quinacridone is substantially insoluble, usually water and/or an alcohol. The resultant crystalline pigment is then further conditioned by solvent treatment or milling in combination with solvent treatment. Similar methods are used to prepare quinacridonequinones from 2,5-dianilino-3,6-dioxo-1,4-cyclohexadiene-1,4-dicarboxylic acid or its derivatives. E.g., U.S. Pat. No. 3,124,582.

It is also possible to use 2,5-dianilino-3,6-dihydroterephthalic acid esters as a starting material in the ring-closure reaction. The resultant 6,13-dihydroquinacridones must, however, be oxidized to corresponding quinacridones before isolation and conditioning. E.g., U.S. Pat. Nos. 4,956,464 and 4,812,568.

Each of the above known processes involves at least one heating step, which often results in undesirable side reactions that produce undesired by-products. Alternative methods that allow the use of lower temperatures or shorter reaction times would thus be advantageous.

Microwave irradiation has been found to be an effective alternative to heating for various organic reactions. E.g., U.S. Pat. No. 5,387,397 and references cited therein; see also A. K. Bose et al., *Res. Chem. Intermed.,* 20, 1–11 (1994), G. Majetich and R. Hicks, *Res. Chem. Intermed.,* 20, 61–67 (1994), B. K. Banik et al., *Biorganic. & Medicinal Chemistry Letters,* 3, 2363–2368 (1993), B. Rechsteiner et al., *Tetrahedron Lett.,* 34, 5071–5074 (1993), B. K. Banik et al., *Tetrahedron Lett.,* 32, 3603–3606 (1992), and C. Strauss, *Chemistry in Australia,* 186 (June, 1990). Russian Patent 2,045,555 discloses the preparation of certain metal phthalocyanines using microwave radiation but the disclosed process requires reaction times of at least 0.5 hours at temperatures of at least 170° C. None of these references discloses the preparation of quinacridone pigments. U.S. Pat. No. 4,956,464 discloses the preparation of quinacridones by exposing suitable precursors to microwave radiation but only as an alternative to using a red-hot pipe to achieve reaction temperatures that must be at least 300° C. and as much as 700° C. This patent does not suggest the use of microwaves at lower temperatures.

It has now been found that quinacridone pigments can be prepared in high yields and purity by exposing 2,5-dianilinoterephthalic acid intermediates to microwave radiation for short periods at moderate temperatures. Quinacridone pigments prepared in this manner are typically purer and exhibit improved coloristic properties, including higher strength, greater transparency, and deeper masstone, than pigments prepared by known thermal processes. The improved color properties are particularly advantageous for automotive applications.

SUMMARY OF THE INVENTION

This invention relates to a process for the preparation of quinacridone pigments comprising (a) exposing a reaction mixture comprising (i) 2,5-dianilinoterephthalic acid, 2,5-dianilino-3,6-dihydroterephthalic acid, 2,5-dianilino-3,6-dioxo-1,4-cyclohexadiene-1,4-dicarboxylic acid, or a derivative thereof having one or more substituents in at least one aniline ring; a salt or ester of said acid or derivative thereof; or a mixture thereof, (ii) about 3 to about 20 parts by weight (preferably 3 to 10 parts by weight), per part of component (a)(i), of a dehydrating agent (preferably polyphosphoric acid), and (iii) 0 to about 20 parts by weight (preferably no more than 10 parts by weight), per part of component (a)(i), of a pigment additive, to microwave radiation (preferably at a frequency of about 2450 MHz) at power levels and exposure times that raise the bulk temperature of the reaction mixture to no more than about 250° C. (preferably no more than 200° C.), with the proviso that if component (a)(i) is a 2,5-dianilino-3,6-dihydroterephthalic acid or derivative thereof, reaction step (a) additionally comprises a subsequent oxidation step (which converts the initially formed dihydroquinacridone intermediate to the corresponding quinacridone);

(b) drowning the reaction mixture from step (a) by adding said reaction mixture to about 3 to about 15 parts by weight (preferably 5 to 10 parts by weight), per part of component (a)(i), of a liquid in which the quinacridone pigment is substantially insoluble;

(c) isolating the quinacridone pigment; and (d) optionally, conditioning the quinacridone pigment.

DETAILED DESCRIPTION OF THE INVENTION

Quinacridone pigments (by which is meant unsubstituted quinacridone, quinacridone derivatives, and solid solutions thereof) are prepared according to the invention by first ring-closing 2,5-dianilinoterephthalic acid precursors, including known aniline-substituted derivatives thereof, as well as their metal or amine salts or esters, by exposing the 2,5-dianilinoterephthalic acid precursors to microwave radiation in the presence of a dehydrating agent (preferably polyphosphoric acid) or, less preferably, by thermally inducing ring closure in a high-boiling solvent. The reaction mixture is then drowned and the resultant quinacridone pigment is isolated by known methods. The quinacridone pigment is preferably also subjected to additional conditioning steps to improve pigmentary properties and, if desired, blended with various additives.

Ring-closure step (a) is carried out in a dehydrating agent, particularly a strong acid such as polyphosphoric acid, acidic esters of polyphosphoric acid, or sulfuric acid. E.g., U.S. Pat. No. 4,758,664; and S. S. Labana and L. L. Labana, "Quinacridones" in *Chemical Reviews,* 67, 1–18 (1967). Polyphosphoric acid having a phosphate content equivalent to about 110–120% $H_3PO_4$ is particularly preferred. When using polyphosphoric acid, the weight ratio of polyphosphoric acid to the total amount of terephthalic acid precursors, including the amount of sulfonyl-containing derivatives, is typically about 3:1 to about 10:1 (preferably 4:1 to8:1).

The reaction mixture of step (a) is exposed to microwave radiation by any conventional method using a conventional microwave source but is preferably carried out by methods described by A. K. Bose et al., *Res. Chem. Intermed.,* 20, 1–11 (1994), G. Majetich and R. Hicks, *Res. Chem. Intermed.,* 20, 61–67 (1994), B. K. Banik et al., *Biorganic. & Medicinal Chemistry Letters,* 3, 2363–2368 (1993), B. Rechsteiner et al., *Tetrahedron Lett.,* 34, 5071–5074 (1993), B. K. Banik et al., *Tetrahedron Lett.,* 32, 3603–3606 (1992), and C. Strauss, *Chemistry in Australia,* 186 (June, 1990). It is possible to use either batchwise or continuous microwave irradiation. Microwave frequencies ranging from about 2450 MHz to about 20 GHz (i.e., 20,000 MHz) are generally suitable, but a frequency of about 2450 MHz is typical of commercial microwave ovens and is preferred. The peak power levels available in commercial microwave ovens are typically between about 80 and 1000 watts, but somewhat lower power levels (or reduced power-on cycle times) can be used as long as the desired reaction occurs and somewhat higher power levels (and increased power-on cycle times) can be used as long as the purity and yield of products are not adversely affected. The temperatures produced during microwave irradiation are generally not critical (within the limitations discussed herein) but temperatures within the bulk reaction mixture (i.e., "bulk temperatures") should be kept below about 250° C. (preferably below 200° C.) to minimize undesirable side reactions that can become increasingly significant at higher temperatures. Furthermore, for safety reasons, power levels and cycle times should generally be selected to provide temperatures well below the boiling point of the reaction medium.

The process of the invention can be used to prepare unsubstituted quinacridone or ring-substituted quinacridone derivatives, depending on whether the ring closure is carried out using unsubstituted 2,5-dianilinoterephthalic acid or a derivative thereof having one or more substituents in at least one of the two aniline rings. Although essentially any 2,5-dianilinoterephthalic acid derivatives known in the art can be used, particularly preferred 2,5-dianilinoterephthalic acid derivatives are those in which both of the aniline moieties are substituted (typically with the same substituent) at the para position with groups such as halogen (preferably chlorine), $C_1$–$C_6$ alkyl (preferably methyl), and $C_1$–$C_6$ alkoxy (preferably methoxy). It is also possible to use derivatives of 2,5-dianilinoterephthalic acid in which the aniline moieties are substituted in the meta positions or in one of the ortho positions. Although generally less preferred, it is also possible to use polyaromatic derivatives of 2,5-dianilinoterephthalic acid in which one or two pairs of adjacent ring atoms of the aniline groups are fused with additional aromatic rings to form polyaromatic ring systems such as naphthalenes, anthracenes, phenanthrenes and the like (each of which can be ring-substituted as described above), provided that at least one ring carbon atom that is ortho to the aniline amino group remains unsubstituted. The corresponding metal or amine salts (preferably alkali or alkaline earth metals salts) or esters (preferably alkyl esters) of each of the above compounds can, of course, also be used. Particularly suitable 2,5-dianilinoterephthalic acid derivatives include 2,5-di(4-chloroanilino)terephthalic acid, 2,5-di(4-methylanilino)terephthalic acid, and 2,5-di(4-methoxyanilino)terephthalic acid.

It is also possible to use mixtures containing 2,5-dianilinoterephthalic acid and one or more derivatives thereof or mixtures containing two or more 2,5-dianilinoterephthalic acid derivatives. The use of such mixtures provides a particularly advantageous method for obtaining quinacridone solid solutions. Mixtures containing 2,5-dianilinoterephthalic acid and/or a derivative thereof in combination with a fully formed quinacridone pigment (generally in crude form) can also be used.

It is sometimes preferable to prepare quinacridones using a 2,5-dianilino-3,6-dihydroterephthalic acid (preferably as a $C_1$–$C_6$ alkyl ester) or a derivative thereof as a starting material in the ring-closure reaction. The resultant dihydroquinacridones are oxidized by known methods (for example, using aromatic nitro compounds, chloroanil, anthraquinone-2-sulfonic acid or a salt thereof, anthraquinone-2,7-disulfonic acid or a salt thereof, air or other oxygen-containing gases, halogens, or electrolytic oxidation) to form the corresponding quinacridones, which are collected by known methods. E.g., S. S. Labana and L. L. Labana, "Quinacridones" in *Chemical Review,* 67, 1–18 (1967) (see pages 4–5), and W. Herbst and K. Hunger, *Industrial Organic Pigments* (New York: VCH Publishers, Inc., 1993), pages 448–449. The present invention is also directed to this variant of quinacridone synthesis. It is, of course, possible to use mixtures of 2,5-dianilino-3,6-dihydroterephthalic acid and/or derivatives thereof to obtain quinacridone solid solutions.

Quinacridonequinones (including solid solutions) can be prepared by the ring closure of 2,5-dianilino-3,6-dioxo-1,4-cyclohexadiene-1,4-dicarboxylic acid or a derivative thereof (including corresponding salts or esters). Particularly preferred 2,5-dianilino-3,6-dioxo-1,4-cyclohexadiene-1,4-dicarboxylic acid derivatives are those in which both of the aniline moieties are substituted (typically with the same substituent) at the para position with groups such as halogen (preferably chlorine), $C_1$–$C_6$ alkyl (preferably methyl), and $C_1$–$C_6$ alkoxy (preferably methoxy). It is, of course, possible to use mixtures of 2,5-dianilino-3,6-dioxo-1,4-cyclohexadiene-1,4-dicarboxylic acid and/or derivatives thereof to obtain quinacridonequinone solid solutions. When preparing solid solutions containing mixtures of quinacridonequinones and quinacridones, it is, of course, necessary to start with appropriate mixtures of 2,5-dianilino-3,6-dioxo-1,4-cyclohexadiene-1,4-dicarboxylic acid and/or its derivatives and 2,5-dianilinoterephthalic acid and/or its derivatives.

It is possible to improve pigment properties by adding various pigment additives to the ring-closure step. Suitable pigment additives include quinacridone derivatives, particularly known quinacridone sulfonic acids and sulfonamides and quinacridone derivatives containing other substituents (such as phthalimidomethyl and sulfobenzimidomethyl derivatives). It is also possible to add the 2,5-dianilinoterephthalic acid precursors of such additives during the ring-closure step, which results in the simultaneous in-situ formation of both the quinacridone and the quinacridone derivative components.

After ring-closure step (a) is completed, the quinacridone pigment is precipitated (i.e., "drowned") in step (b) by adding the strongly acidic melt a liquid in which the quinacridone pigment is substantially insoluble, preferably water, a water-miscible solvent (such as methanol, or other lower aliphatic alcohols), or mixtures thereof. Although it is possible to add the drowning liquid to the acidic melt (e.g., U.S. Pat. No. 3,265,699), the present invention is preferably carried out by adding the acidic melt to the solvent (compare U.S. Pat. No. 4,100,162).

Suitable drowning liquids include water and/or water-miscible organic liquids; including, for example, lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

The temperature of the drowning liquid is usually between about 5° C. and about 65° C. In general, lower drown temperatures give pigments having smaller particle sizes. However, because process cycle time is also very important (because of manufacturing cost), a shorter drowning time is preferred. The presence of pigment derivatives that act in part as particle growth inhibitors allows the solvent temperature to rise during the drowning process, thus shortening the time without excessive particle size growth.

The drowned pigment is then isolated in step (c) using methods known in the art, such as filtration, and then dried if desired. Other collection methods known in the art, such as centrifugation, microfiltration, or even simple decantation, are also suitable.

The crystalline pigment obtained in step (c) can be conditioned in an optional step (d) using methods known in the art, such as solvent treatment or milling in combination with solvent treatment. Final particle size of the pigment can be controlled by varying the method of after-treatment. For example, pigments can be made more transparent by the particle size or more opaque by increasing the particle size. Suitable milling methods include dry-milling methods such as sand-milling, ball-milling, and the like, with or without additives, or wet-milling methods such as salt-kneading, bead-milling, and the like in water or organic solvents, with or without additives.

Tinctorial strength and transparency of the pigment can also be affected by solvent treatment carried out by heating a dispersion of the pigment, often in the presence of additives, in a suitable solvent. Suitable solvents include organic solvents, such as alcohols, esters, ketones, and aliphatic and aromatic hydrocarbons and derivatives thereof, and inorganic solvents, such as water. Suitable additives include compositions that lessen or avoid flocculation, increase pigment dispersion stability, and reduce coating viscosity, such as polymeric dispersants (or surfactants). E.g., U.S. Pat. Nos. 4,455,173; 4,758,664; 4,844,742; 4,895,948; and, 4,895,949.

During or after the conditioning step it is often desirable to use various other optional ingredients that provide improved properties. Examples of such optional ingredients include fatty acids having at least 12 carbon atoms, such as stearic acid or behenic acid, or corresponding amides, esters, or salts, such as magnesium stearate, zinc stearate, aluminum stearate, or magnesium behenate; quaternary ammonium compounds, such as tri[($C_1$–$C_4$ alkyl)benzyl] ammonium salts; plasticizers, such as epoxidized soya bean oil; waxes, such as polyethylene wax; resin acids, such as abietic acid, rosin soap, hydrogenated or dimerized rosin; $C_{12}$–$C_{18}$-paraffin-disulfonic acids; alkylphenols; alcohols, such as stearyl alcohol; amines, such as laurylamine or stearylamine; and aliphatic 1,2-diols, such as dodecane-1,2-diol. Such additives can be incorporated in amounts ranging from about 0.05 to 20% by weight (preferably 1 to 10% by weight), based on the amount of pigment.

After the pigment has been isolated and optionally conditioned, the pigment can be blended (preferably by dry blending) with one or more additives known in the art. Suitable pigment additives include various pigment derivatives, particularly quinacridone derivatives such as known quinacridone sulfonic acids and sulfonamides and quinacridone derivatives containing other substituents (such as phthalimidomethyl and sulfobenzimidomethyl derivatives).

Pigments prepared according to the invention characteristically exhibit deep masstones, high tinctorial strengths, and blue tints, all of which are highly desirable characteristics of quinacridone pigments, especially when used for automotive applications. The pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastics materials).

Because of their light stability and migration properties, the quinacridone pigments prepared according to the present invention are suitable for many different pigment applications. For example, pigments prepared according to the invention can be used as the colorant (or as one of two or more colorants) for very fast pigmented systems, such as mixtures with other materials, pigment formulations, paints, printing ink, colored paper, or colored macromolecular materials. The term "mixture with other materials" can be understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides: polymers and copolymers of acrylates, methacrylates, acrylonitrile, acrylamide, butadiene, or styrene; polyurethanes; and polycarbonates. The materials pigmented with the quinacridone pigments of the present invention can have any desired shape or form.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Microwave irradiation for the following examples was provided by a GE model JES 1030TW microwave oven operating at about 2450 MHz and 800 watts.

Solvent-based paint tests were carried out using a generic alkyd melamine paint system. Pigment dispersions were prepared using a mixture of 33% AROPLAZ® 1453-X-50 alkyd resin (Reichhold Chemicals, Inc.), 63% xylene, and 4% pigment, which gave a pigment-to-binder ratio of 4:33 and a total solids content of 37%. The pigment-to-binder ratio was reduced 1:10 by addition of 2.3% AROPLAZ® 1453-X-50 alkyd resin and 6.5% RESIMENE® 717 melamine resin (Monsanto Company), which gave a total solids content of 40%. Masstone and transparency measurements were made using films applied at 152 μm and 38 μm wet film thickness, respectively, and flashed at room temperature for 30 minutes and at 121° C. for 30 minutes.

Undertone tint paints were prepared from the dispersion described above having a pigment-to-binder ratio of 4:33 by adding 31% of a dispersion prepared from 30% AROPLAZ® 1453-X-50 alkyd resin, 20% xylene, 5% NUOSPERSE® 657 (Hüls America), and 50% TI-PURE® R-960 $TiO_2$ pigment (DuPont); 21% AROPLAZ® 1453-X-50 alkyd resin; and 7% RESIMENE® 717 melamine resin, which gave a pigment-to-binder ratio of 1:2, a total solids content of 50%, and a $TiO_2$-to-pigment ratio of 90:10. Color measurements were made using films applied at 76 μm wet film thickness and flashed at room temperature for 30 minutes and at 121° C. for 30 minutes.

Metallic paints were prepared from the dispersion described above having a pigment-to-binder ratio of 4:33 using an aluminum paste (available as 5251 AR from Silberline Manufacturing Co., Inc.), AROPLAZ® 1453-X-50 alkyd resin, and RESIMENE® 717 melamine resin in quantities that provided a pigment-to-binder ratio of 1:9, an aluminum-to-pigment ratio of 20:80, and a total solids content of 41%. Color measurements were made using films applied at 76 μm wet film thickness and flashed at room temperature for 30 minutes and at 121° C. for 30 minutes.

Example 1

Crude quinacridone

To 120.0 g of polyphosphoric acid (116%) was added with stirring 20.0 g (57.4 mmol) of 2,5-bis(phenylamino) terephthalic acid. The stirred mixture was irradiated in the microwave oven for 1.5 minutes. The reaction mixture was cooled to 80° C. and added with stirring to 1.0 liter of water. The resultant slurry was stirred for 30 minutes, after which the solid component was collected by filtration and washed with 6.0 liters of water. The presscake was dried overnight in an oven at 60° C. to give 17.9 g of crude quinacridone (C. I. Pigment Violet 19) (100% yield).

Example 2

Crude 2,9-dimethylquinacridone

To 150.0 g of polyphosphoric acid (118%) was added with stirring 30.0 g (79.7 mmol) of 2,5-bis(p-toluidino) terephthalic acid. The stirred mixture was irradiated in the microwave oven for 2.5 minutes. After the reaction mixture was cooled to 130° C., 250 g of water was slowly added with stirring. The resultant slurry was stirred for 30 minutes, after which the solid component was collected by filtration and washed with 6.0 liters of water. The presscake was dried overnight in an oven at 60° C. to give 27.0 g of crude 2,9-dimethylquinacridone (C. I. Pigment Red 122) (100% yield).

Example 3

Pigmentary 2,9-dimethylquinacridone

To 200.0 g of polyphosphoric acid (118%) was added in portions with stirring at 80° C. 50.0 g (133 mmol) of 2,5-bis(p-toluidino)terephthalic acid. The stirred mixture was irradiated in the microwave oven for 2.0 minutes, during which time the temperature rose to 230° C. The reaction mixture was cooled to 150° C. and drowned in 400 g of methanol with vigorous stirring. The resultant methanol suspension was heated at reflux for one hour, cooled to 60° C., added to 800 g of water, and heated at 60° C. for 30 minutes. The solid component was collected by filtration, washed with 12.0 liters of water, and reslurried with water. [A sample of the crude pigment was collected at this point for X-ray analysis.] After 50.0 g of 50% aqueous sodium hydroxide was added, the alkaline slurry was heated at 90–92° C. for two hours. The solid component was collected by filtration and washed with 12.0 liters of water. The resultant presscake (280 g total, with a pigment content of 40.0 g) was reslurried with water. After adjustment of the pH to 9.0, the slurry was heated for two hours in an autoclave at 140° C., then cooled to room temperature. After adjustment of the pH to 4.5, the slurry was treated with an emulsion of 2.0 g of an anionic surfactant, 25 g of a petroleum distillate, and 40 g of water and stirred for three hours at 45° C. The solid component was collected by filtration and washed with 6.0 liters of water. The presscake was dried overnight in an oven at 60° C. to give 38.0 g of pigmentary quality 2,9-dimethylquinacridone. X-ray diffraction patterns of both the dried acid crude (collected as described above) and the finished pigment were similar to the diffraction pattern of a commercially available 2,9-dimethylquinacridone pigment (i.e., QUINDO Magenta RV-6832 from Bayer Corporation) prepared by a conventional heating method.

Example 4

2,9-Dichloroquinacridone treated with crystal growth inhibitor

To 200.0 g of polyphosphoric acid (118%) were added 30.0 g (71.7 mmol) of 2,5-bis(p-chloroanilino)terephthalic acid and 0.6 g of phthalimidomethylquinacridone. The stirred mixture was irradiated in the microwave oven for 2.0 minutes. The reaction mixture was cooled to 150° C. and drowned in 400 g of methanol with vigorous stirring. The resultant methanol suspension was maintained at reflux for one hour, cooled to 60° C., added to 800 g of water, and heated at 60° C. for 30 minutes. The solid component was collected by filtration and washed with 8.0 liters of water. The presscake was dried overnight in an oven at 60° C. to give 28.0 g of 2,9-dichloroquinacridone (C. I. Pigment Red 202).

Example 5

Pigmentary solid solution of quinacridone and 2,9-dimethylquinacridone

To 200.0 g of polyphosphoric acid (118%) were added in portions at 80° C. 12.5 g (35.9 mmol) of 2,5-bis (phenylamino)terephthalic acid and 37.5 g (100 mmol) of 2,5-bis(p-toluidino)terephthalic acid. The stirred mixture was irradiated in the microwave oven for 2.0 minutes. The reaction mixture was cooled to 150° C., then drowned in 1 kg of ice/water. The suspension was stirred, after which the solid component was collected by filtration and washed with 8.0 liters of water. The presscake (75.0 g total, with a pigment content of 17.8 g) was reslurried in water. After adjustment of the pH to 9.0, 133.2 g of methanol was added and the mixture was heated at 116° C. for three hours. After the mixture was cooled to room temperature, the solid component was collected by filtration and washed with 8.0 liters of water. The presscake was dried overnight in an oven at 60° C. to give 17.0 g of a solid solution of quinacridone and 2,9-dimethylquinacridone.

Solvent-based paints prepared as described above exhibited deeper masstone, higher tinctorial strength, bluer tint, and greater transparency than comparison paints prepared using a commercially available solid solution of quinacridone and 2,9-dimethylquinacridone (i.e., QUINDO Magenta RV-6825 from Bayer Corporation).

Example 6

6,13-Dihydroquinacridone

To 120.0 g of polyphosphoric acid (118%) was added with stirring 20.0 g (52.9 mmol) of 2,5-bis(phenylamino)-1,4-cyclohexadiene-1,4-dicarboxylic acid dimethyl ester. The stirred mixture was irradiated in the microwave oven for 1.5 minutes. After the reaction mixture was cooled to 80° C., water was added with stirring. The resultant slurry was stirred for 5 minutes, after which the solid component was collected by filtration and washed with 3.0 liters of water. The presscake was dried overnight in an oven at 60° C. to give 15.9 g of 6,13-dihydroquinacridone (95.7% yield, 97.0% spectroscopic purity).

Example 7

Pigmentary solid solution of quinacridone and 6,13-quinacridonequinone

To 300.0 g of polyphosphoric acid (118%) were added in portions at 80° C. 30.0 g (86.1 mmol) of 2,5-bis(phenylamino)terephthalic acid and 20.0 g (52.9 mmol) of 2,5-dianilino-3,6-dioxo-1,4-cyclohexadiene-1,4-dicarboxylic acid. The stirred mixture was irradiated in the microwave oven for 2.5 minutes. The reaction mixture was cooled to 150° C. and drowned in 1.2 kg of ice/water. After the suspension was stirred, the solid component was collected by filtration and washed with 8.0 liters of water to yield a presscake having a solid solution pigment content of 42.6 g.

What is claimed is:

1. A process for the preparation of quinacridone pigments comprising (a) exposing a reaction mixture comprising (i) 2,5-dianilinoterephthalic acid, 2,5-dianilino-3,6-dihydroterephthalic acid, 2,5-dianilino-3,6-dioxo-1,4-cyclohexadiene-1,4-dicarboxylic acid, or a derivative thereof having one or more substituents in at least one aniline ring; a salt or ester of said acid or derivative thereof; or a mixture thereof, (ii) about 3 to about 20 parts by weight, per part of component (a)(i), of a dehydrating agent, and (iii) 0 to about 20 parts by weight, per part of component (a)(i), of a pigment additive, to microwave radiation at power levels and exposure times that raise the bulk temperature of the reaction mixture to no more than about 250° C., with the proviso that if component (a)(i) is a 2,5-dianilino-3,6dihydroterephthalic acid or derivative thereof, reaction step (a) additionally comprises an oxidation step;

(b) drowning the reaction mixture from step (a) by adding said reaction mixture to about 3 to about 15 parts by weight, per part of component (a)(i), of a liquid in which the quinacridone pigment is substantially insoluble;

(c) isolating the quinacridone pigment; and (d) optionally, conditioning the quinacridone pigment.

2. A process according to claim 1 wherein the microwave radiation has a frequency of about 2450 MHz.

3. A process according to claim 1 wherein 3 to 10 parts by weight, per part of component (a)(i), of a dehydrating agent is used.

4. A process according to claim 1 wherein the dehydrating agent is polyphosphoric acid.

5. A process according to claim 1 wherein the bulk temperature of the reaction mixture rises to no more than 200° C. during exposure to microwave radiation.

6. A process according to claim 1 wherein the reaction mixture from step (a) is drowned in water and/or a water-miscible organic liquid.

7. A process according to claim 1 wherein the reaction mixture from step (a) is drowned in water, methanol, or a mixture thereof.

8. A process according to claim 1 wherein component (a)(i) is 2,5-dianilinoterephthalic acid or a derivative thereof in which both aniline moieties are substituted at the para position with halogen, $C_1$–$C_6$ alkyl, or $C_1$–$C_6$ alkoxy; 2,5-dianilino-3,6-dihydroterephthalic acid or a derivative thereof in which both aniline moieties are substituted at the para position with halogen, $C_1$–$C_6$ alkyl, or $C_1$–$C_6$ alkoxy; 2,5-dianilino-3,6-dioxo-1,4-cyclohexadiene-1,4-dicarboxylic acid or a derivative thereof in which both aniline moieties are substituted at the para position with halogen, $C_1$–$C_6$ alkyl, or $C_1$–$C_6$ alkoxy; or a mixture thereof.

9. A process according to claim 1 wherein component (a)(i) is 2,5-dianilinoterephthalic acid, 2,5-di(4-chloroanilino)terephthalic acid, 2,5-di(4-methylanilino)terephthalic acid, 2,5-di(4-methoxyanilino)terephthalic acid, or a mixture thereof.

10. A process according to claim 1 comprising (a) exposing a reaction mixture comprising (i) 2,5-dianilinoterephthalic acid, 2,5-di(4-chloroanilino)terephthalic acid, 2,5-di(4-methylanilino)terephthalic acid, 2,5-di(4-methoxyanilino)terephthalic acid, or a mixture thereof, (ii) 3 to 10 parts by weight, per part of component (a)(i), of polyphosphoric acid, and (iii) 0 to about 20 parts by weight, per part of component (a)(i), of a pigment additive, to microwave radiation at a frequency of about 2450 MHz and at power levels and exposure times that raise the bulk temperature of the reaction mixture to no more than 250° C.;

(b) drowning the reaction mixture from step (a) by adding said reaction mixture to about 3 to about 15 parts by weight, per part of component (a)(i), of water and/or a water-miscible organic liquid;

(c) isolating the quinacridone pigment; and (d) optionally, conditioning the quinacridone pigment.

11. A process according to claim 1 comprising (a1) exposing a reaction mixture comprising (i) 2,5-dianilino-3,6-dihydroterephthalic acid or a derivative thereof in which both aniline moieties are substituted at the para position with halogen, $C_1$–$C_6$ alkyl or $C_1$–$C_6$ alkoxy;

(ii) 3 to 10 parts by weight, per part of component (a)(i), of polyphosphoric acid, and (iii) 0 to about 20 parts by weight, per part of component (a)(i), of a pigment additive, to microwave radiation at a frequency of about 2450 MHz and at power levels and exposure times that raise the bulk temperature of the reaction mixture to no more than 250° C.;

(a2) oxidizing the reaction product from step (a1);

(b) drowning the reaction mixture from step (a2) by adding said reaction mixture to about 3 to about 15 parts by weight, per part of component (a1)(i), of water and/or a water-miscible organic liquid;

(c) isolating the quinacridone pigment; and (d) optionally, conditioning the quinacridone pigment.

12. A process according to claim 1 comprising (a) exposing a reaction mixture comprising (i) 2,5-dianilino-3,6-dioxo-1,4-cyclohexadiene-1,4-dicarboxylic acid or a mixture thereof with 2,5-dianilinoterephthalic acid, 2,5-di(4-chloroanilino) terephthalic acid, 2,5-di( 4-methylanilino) terephthalic acid, or 2,5-di(4-methoxyanilino) terephthalic acid, (ii) 3 to 10 parts by weight, per part of component (a)(i), of polyphosphoric acid, and (iii) 0 to about 20 parts by weight, per part of component (a)(i), of a pigment additive, to microwave radiation at a frequency of about 2450 MHz and at power levels and exposure times that raise the bulk temperature of the reaction mixture to no more than 250° C.;

(b) drowning the reaction mixture from step (a) by adding said reaction mixture to about 3 to about 15 parts by weight, per part of component (a)(i), of water and/or a water-miscible organic liquid;

(c) isolating the pigment; and (d) optionally, conditioning the pigment.

* * * * *